United States Patent
Zhang et al.

(10) Patent No.: US 9,036,723 B2
(45) Date of Patent: May 19, 2015

(54) FULL-RANGE PILOT-ASSISTED FREQUENCY OFFSET ESTIMATION FOR OFDM COMMUNICATION SYSTEMS

(71) Applicant: NEC Laboratories America, Inc., Princeton, NJ (US)

(72) Inventors: Shaoliang Zhang, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/032,449

(22) Filed: Sep. 20, 2013

(65) Prior Publication Data

US 2014/0079164 A1 Mar. 20, 2014

Related U.S. Application Data

(60) Provisional application No. 61/703,310, filed on Sep. 20, 2012.

(51) Int. Cl.
*H04L 7/04* (2006.01)
*H04L 27/26* (2006.01)

(52) U.S. Cl.
CPC ............ *H04L 7/042* (2013.01); *H04L 27/2601* (2013.01); *H04L 27/2613* (2013.01); *H04L 27/2657* (2013.01); *H04L 27/2663* (2013.01); *H04L 27/2671* (2013.01); *H04L 27/2672* (2013.01); *H04L 27/2675* (2013.01)

(58) Field of Classification Search
CPC . H04L 27/2601; H04L 7/042; H04L 27/2663; H04L 27/2657
USPC ............... 375/260, 259, 343; 45/59; 370/69.1
See application file for complete search history.

(56) References Cited

U.S. PATENT DOCUMENTS

| | | | | |
|---|---|---|---|---|
| 5,732,113 | A  * | 3/1998 | Schmidl et al. | 375/355 |
| 6,853,616 | B1 * | 2/2005 | Kim et al. | 370/210 |
| 7,187,734 | B2 * | 3/2007 | Magee et al. | 375/346 |
| 7,286,617 | B2 * | 10/2007 | Vanderperren et al. | 375/343 |
| 2004/0180635 | A1 * | 9/2004 | Choi et al. | 455/113 |
| 2005/0135432 | A1 * | 6/2005 | Kelley et al. | 370/532 |
| 2008/0232496 | A1 * | 9/2008 | Lin et al. | 375/260 |
| 2014/0169501 | A1 * | 6/2014 | Nazarathy et al. | 375/316 |

OTHER PUBLICATIONS

IEEE Transactions on Communications, vol. 54, No. 5, May 2006 813 Carrier Frequency Offset Estimation for OFDM Systems Using Null Subcarriers Defeng (David) Huang, Member, IEEE, and Khaled Ben Letaief, Fellow, IEEE.*

* cited by examiner

*Primary Examiner* — Shuwang Liu
*Assistant Examiner* — Helene Tayong
(74) *Attorney, Agent, or Firm* — Joseph Kolodka

(57) ABSTRACT

A training symbol with two identical halves as well as a pilot-tone at a center frequency is used for both timing synchronization and carrier frequency offset estimation. A timing synchronization is achieved by finding a peak of a cross-correlation function of the two halves in the first symbol. A fraction part of the frequency offset FO is then calculated from a phase difference between the two halves of the first training symbol. Then, the received signal is compensated for the fraction part of FO, and, an integer part of the FO is obtained by counting the shifted positions of the pilot-tone peak in the frequency domain.

11 Claims, 4 Drawing Sheets

FULL-RANGE PILOT-ASSISTED FREQUENCY OFFSET ESTIMATION FOR OFDM COMMUNICATION SYSTEMS

This application claims the benefit of U.S. Provisional Application No. 61/703,310, entitled "Full-Range Pilot-Assisted Frequency Offset Estimation for OFDM Systems", filed Sep. 20, 2012, of which the contents are incorporated herein by reference.

BACKGROUND OF THE INVENTION

The present invention relates generally to optical communications and, more particularly, to full-range pilot-assisted frequency offset estimation for orthogonal frequency-division multiplexing OFDM communication systems.

Orthogonal frequency-division multiplexing (OFDM) has attracted much research interest due to its dispersion resistance, ease of frequency domain equalization and high spectral efficiency. However, OFDM systems are very sensitive to carrier frequency offset (FO) and they can only tolerate offsets within a small fraction of the subcarrier spacing. FO will result in loss of orthogonality between subcarriers and thus degrade the system performance. Thus, frequency offset compensation (FOC) is the most critical function to implement. The key challenge in FOC for CO-OFDM systems is to estimate the FO both accurately and efficiently with a full acquisition range.

FIG. 1 shows the maximum frequency offset which an OFDM system can tolerate. Supposing that an OFDM signal covers a bandwidth of Bs, its maximum bandwidth can only go up to the bandwidth of a digital-to-analog converter (DAC) which generates the OFDM signal. Here we use Rs to denote the sampling rate of the DAC. In other words, Rs>=Bs. At the receiver side, after down-converting the OFDM signal into electrical domain, a anti-aliasing low-pass filter is necessary to prevent frequency overlapping when sampling the received signal back to Rs samples per second. The bandwidth of the low-pass filter is also capped at Rs/2 to avoid potential aliasing issue. On the other hand, the local oscillator used in the coherent receiver is very likely to have a different frequency from the transmitter laser which is caused by manufacturing imperfection, overheating, ageing and so on. As a result, the OFDM signal is designed to have guardband to avoid the power loss because of the filtering from anti-aliasing low-pass filter at the receiver side. This guardband will determine the maximum frequency offset which the OFDM signal can tolerate. For example, when the Bs is only half of the total DAC bandwidth and anti-aliasing filter bandwidth is set at its maximum, i.e., Bs=Rs/2 and Be=Rs/2, the frequency offset range of this designed OFDM system can be from −Rs/4 to +Rs/4. Based on this design procedure of the OFDM systems, the proposed pilot-assisted FOE could have this full-range estimation with high accuracy.

The first prior frequency offset compensation FOC method was proposed in 1994 and only achieved an estimation range of half a subcarrier spacing of the training symbol by observing the phase variation between two identical OFDM symbols. Shortened repeated symbols could be used to extend the estimation range, but it would lead to inaccuracy if the symbols are used for channel estimation.

The first group of FOC methods all used multiple shortened identical training symbols (in time domain) to increase the estimation range. A prior effort employed a training symbol composed of L>2 identical parts and thus the estimation range is increased to ±L/2 subcarrier spacing. Other prior efforts also utilize a similar repetitive signal structure inside an OFDM symbol to increase the estimation range. In another prior effort, a fixed-length training-symbol-block, which consists of multiple small identical training symbols, is used. For all the FOC methods based on the repetitive structure, a proper L needs to be tried out and properly picked to cover the correct estimation range and to get accurate result. And additional procedures, like the multistage algorithm adopted in a prior work or extra fine FOC stages in another prior work, are designed to solve the tradeoff between accuracy (smaller L) and range (larger L). Thus, methods based on L repetitive slots within one symbol (or L repetitive shortened symbols) are more usually complicated.

The frequency offset FO can be divided into a fraction and an integer part of the subcarrier spacing. The second group of FOC methods estimates the fraction and integer part of the subcarrier spacing separately. A prior work proposed an efficient FOC algorithm based on the transmission of a training symbol composed of two identical halves in the time domain to get the fraction part of FO. And a second training symbol contains a pseudo noise sequence to estimate the integer part. In a prior work, the author employs a repeated pseudo-noise sequence in the frequency domain. In this kind of approaches, a merit function is usually introduced. The integer part of the FO is estimated by exhaustive search to optimize the merit function over a large number of integer candidates. And the searching space would be as large as the FFT size to obtain the full estimation range. Thus, methods based on maximizing merit function to find the integer part of FO are usually computationally expensive.

These prior FOC methods are designed for wireless systems, where multi-path fading is more troublesome than a large FO. A novel algorithm using sample-shifted training symbols was proposed for the fast acquisition of FO in the CO-OFDM systems. The fractional part is calculated from the cross-correlation function between the two training symbols. The third training symbol is added to estimate the integer part. The temporal samples of the third training symbols are designed to be the same as the first two training symbols, but with a sample shift. And more training symbols of different sample shifts are attached to the training sequence to improve the estimation accuracy. This method is computationally simpler than the previous methods and can cover the full range if p=1, which is unrealistic in practical systems because of signal power filtering by the limited receiver bandwidth. However, it needs at least three training symbols and the parameter of shifted samples needs to be optimized for different value of FO.

Accordingly, there is a need for a frequency offset compensation that improves over the prior art.

BRIEF SUMMARY OF THE INVENTION

In an aspect of the present invention, a computer implemented method for full-range pilot assisted frequency offset estimation in an orthogonal frequency-division multiplexing OFDM communication system includes a training symbol with two identical halves as well as a pilot-tone at a center frequency is used for both timing synchronization and carrier frequency offset estimation. A timing synchronization is achieved by finding a peak of a cross-correlation function of the two halves in the first symbol. A fraction part of the frequency offset FO is then calculated from a phase difference between the two halves of the first training symbol. Then, the received signal is compensated for the fraction part of FO, and, an integer part of the FO is obtained by counting the shifted positions of the pilot-tone peak in the frequency domain.

DETAILED DESCRIPTION

The invention is directed to a novel FOC method based on a pilot-tone for orthogonal frequency-division multiplexing OFDM systems. The present inventive method can achieve a full estimation range, which is determined by the signal spectrum allocation and receiver bandwidth, by inserting only one pilot tone at the center of the spectrum. The integer part of the frequency offset FO is estimated by counting the shifted positions of the pilot tone in the received signal, while the fraction part of the FO is calculated simultaneously with time synchronization. Only one training symbol is needed for FO acquisition.

A training symbol with two identical halves as well as a pilot-tone at the center frequency is used for both timing synchronization and carrier frequency offset estimation. The pilot tone has a larger power than other subcarriers in the FFT spectrum. The timing synchronization is achieved by finding the peak of the cross-correlation function of the two halves in the first symbol. The fraction part of FO is then calculated from the phase difference between the two halves of the first training symbol. Then, the received signal is compensated for the fraction part of FO. And the integer part of FO is obtained by counting the shifted positions of the pilot-tone (peak) in the frequency domain.

Figures 1, 2:
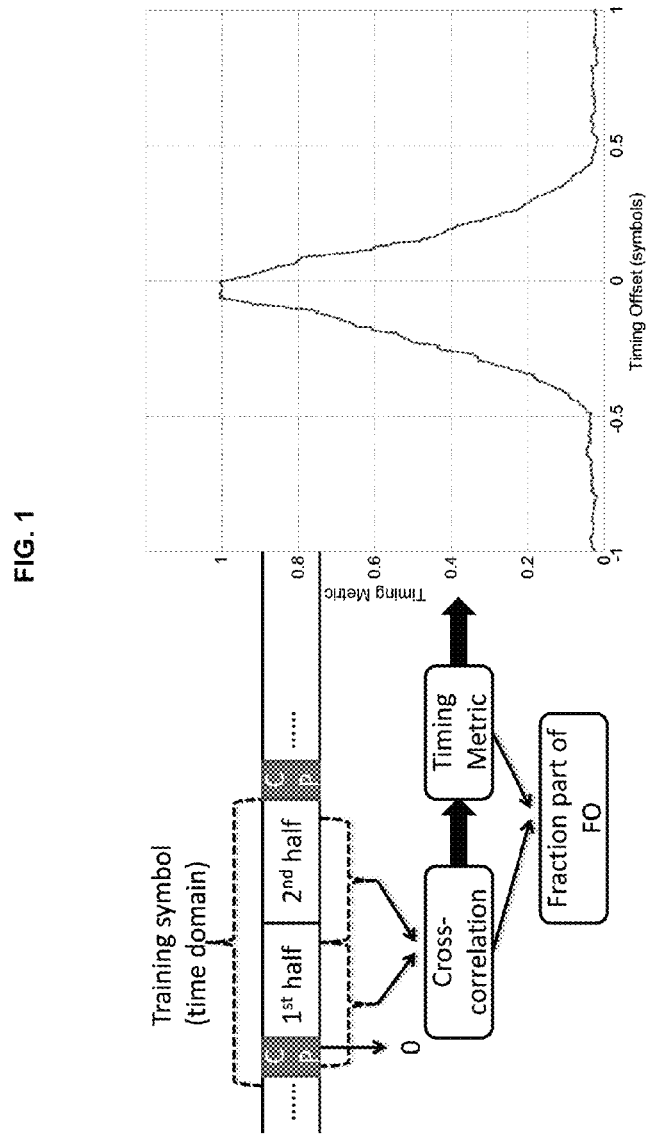
FIG. 1 illustrates a full range frequency offset estimation FOE in OFDM systems.
FIG. 2 is a diagram of a configuration of a time-domain training symbol and diagram of a timing synchronization and fraction part of frequency offset FO estimation, in accordance with the invention.

FIG. 2 shows a configuration of the time-domain training symbol, which consists of two identical halves, a $1^{st}$ half and $2^{nd}$ half. At the receiver side, a cross-correlation function between the two halves is calculated. A timing metric is computed as the normalized squared value of the cross-correlation function. As the starting point is initially unknown at the receiver side, the cross-correlation function and the timing metric is calculated for different timing offsets. The correct timing offset is found by maximizing the timing metric, and, the fraction part of a frequency offset FO is computed from the phase difference between the two halves at the correct timing offset.

Figure 3:
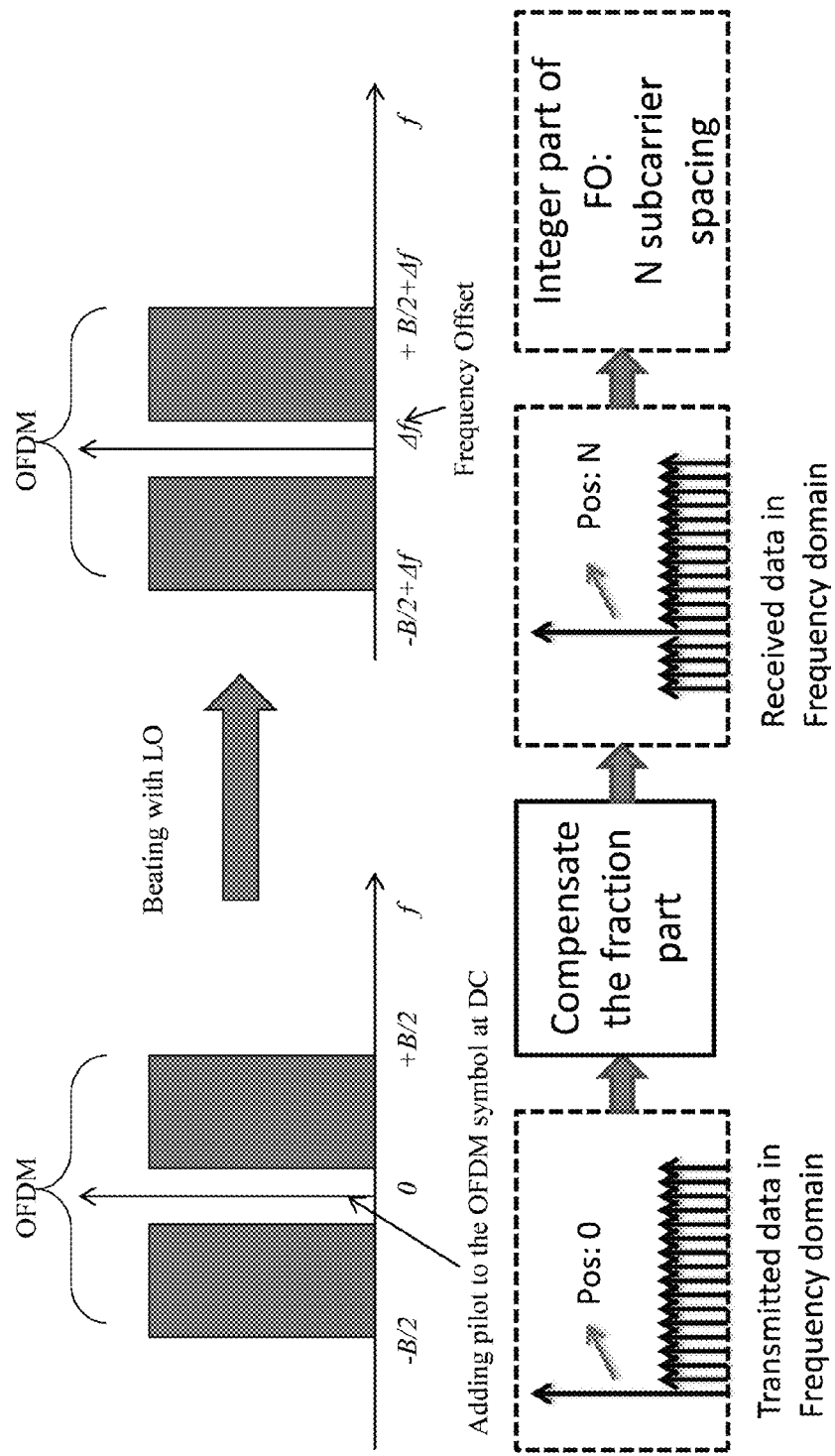
FIG. 3 is a diagram of a configuration of a frequency domain training symbol and diagram of integer part of FO estimation, in accordance with the invention.

FIG. 3 shows a frequency domain configuration of the training symbol. A pilot tone with highest energy is inserted into the OFDM symbol at zero frequency (DC). After beating with a local oscillator LO at the receiver side, the pilot will be shifted away due to the frequency offset FO. The inventive method first compensates for the fraction part of frequency offset FO (based on the previous FIG. 1). After taking a fast Fourier transform FFT, the peak position of the received data can easily be found. The peak will be shifted N positions away. Thus, the integer part of FO is estimated as N times the subcarrier spacing.

Figure 4:
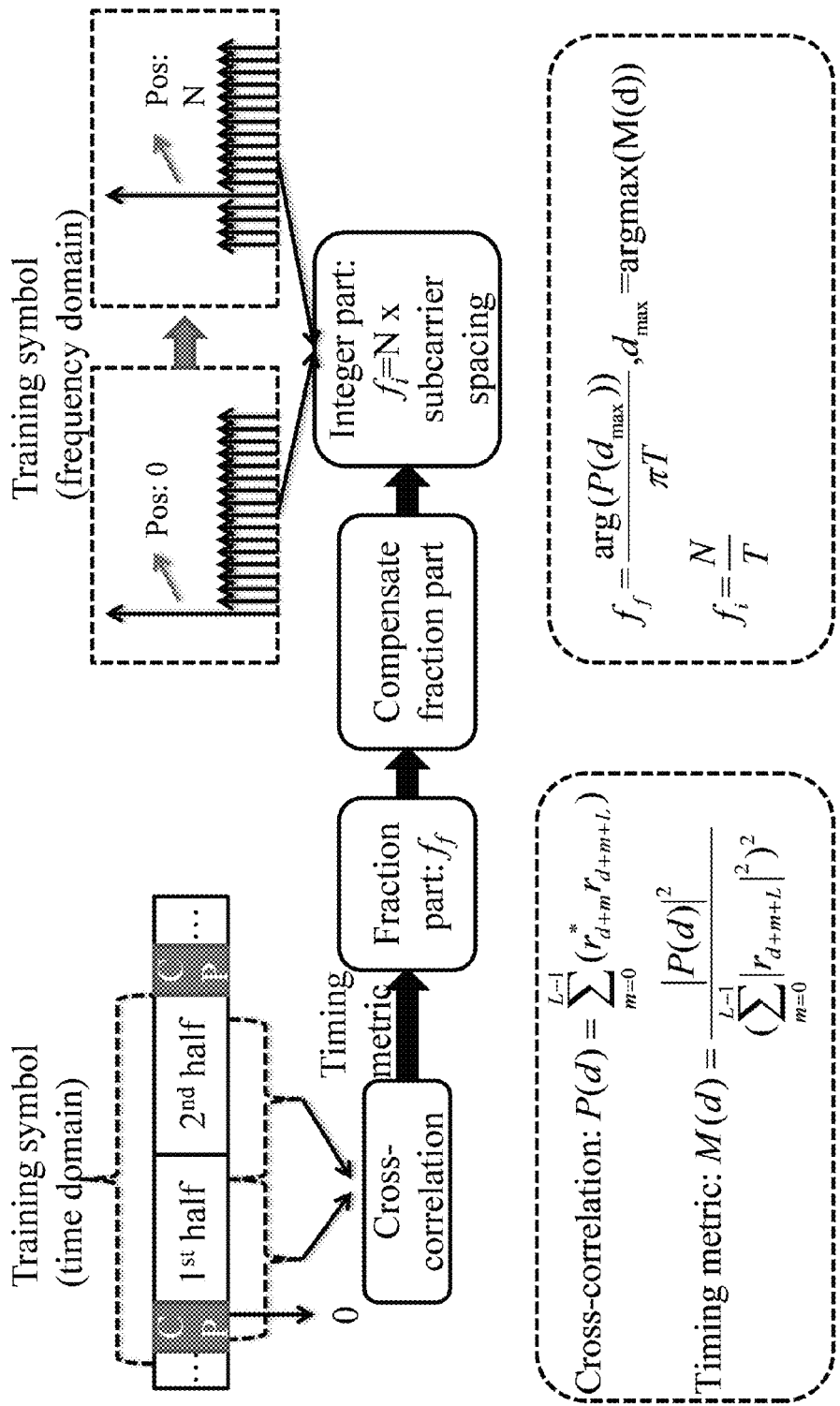
FIG. 4 is a diagram of the full-range pilot-assisted frequency offset estimation, combining the timing synchronization and fraction diagram of FIG. 2 and the frequency domain training symbol and integer part of FO estimation of FIG. 3, in accordance with the invention.

FIG. 4 is a diagram of the full-range pilot-assisted frequency offset estimation, combining the timing synchronization and fraction diagram of FIG. 2 and the frequency domain training symbol and integer part of FO estimation of FIG. 3. As detailed above, at the receiver side, the cross-correlation function between the two halves of the time-domain training symbol is calculated. The timing metric is computed as the normalized squared value of the cross-correlation function. As the starting point is initially unknown at the receiver side, the cross-correlation function and the timing metric is calculated for different timing offsets. The correct timing offset is found by maximizing the timing metric, and, the fraction part of FO is computed from the phase difference between the two halves at the correct timing offset. A pilot tone with highest energy is inserted into the OFDM symbol at zero frequency (DC), indicated as "Pos 0" in the diagram. After beating with the LO at the receiver side, the pilot will be shifted away due to the FO. The invention first compensates for the fraction part of the frequency offset FO. After taking FFT, the peak position of the received data can easily be found. The peak will be shifted N positions away. Thus, the integer part of the FO is estimated as N times the subcarrier spacing.

The cross-correlation and timing metric are represented by the following relationships:

$$\text{Cross-correlation: } P(d) = \sum_{m=0}^{L-1} (r^*_{d+m} r_{d+m+L})$$

$$\text{Timing metric: } M(d) = \frac{|P(d)|^2}{\left(\sum_{m=0}^{L-1} |r_{d+m+L}|^2\right)^2}$$

and the integer fraction is represented as:

$$f_f = \frac{\arg(P(d_{max}))}{\pi T},$$
$$d_{max} = \arg\max(M(d))$$
$$f_i = \frac{N}{T}$$

where L represents the training symbol length, d and m stands for the sample index in the training OFDM symbols, $r_{d+m}$ represents, $r_{d+m+L}$, respectively, represent the (d+m)th and (d+m+L)th OFDM samples. The integer frequency offset is computed from the peak index (N) in the frequency domain of OFDM signals, and here T is the OFDM symbol period. The fractional frequency is given by the phase at the synchronization point of the OFDM symbols.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 5:
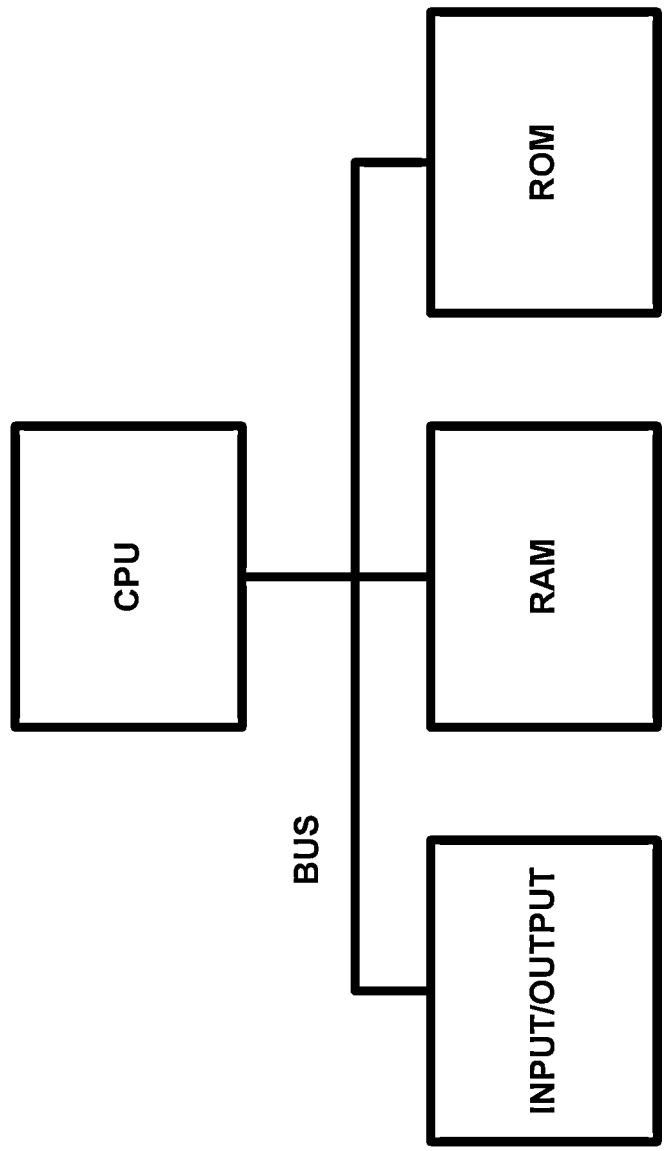
FIG. 5 shows an exemplary computer to perform the inventive frequency offset estimation.

By way of example, a block diagram of a computer to support the system is discussed next in FIG. 5. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in one of or combination of analog or digital form over one or a number of communication links such as a serial link, local area network, wireless link, optical link and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the key challenge in FOC for CO-OFDM systems is to estimate the integer part of FO both accurately and efficiently with a wide acquisition range. Compared to the prior literature, the present inventive method only needs one training symbol with an inserted pilot-tone. It can simultaneously do timing synchronization and frequency synchronization with widest estimation range and high accuracy. The usage of only one training symbol is able to improve the system spectral efficiency compared to other FOE methods. The integer part acquisition will be correct as long as the power of the pilot-tone is large enough compared to other subcarriers. Besides, there is no need for extra steps or any exhaustive search. Thus, present inventive method is both simple and efficient, which well addresses the challenge. In other words, the present inventive approach has the following merits: low computation complexity, lower cost and high tolerance to noise. In addition, the pilot-tone can be also used for phase estimation to further improve the system performance with a fixed low-pass filter.

From the foregoing it can also be appreciated that the inventive estimation of the integer part of FO using pilot-tone is new. The inventive method can cover the whole range by finding the peak position of the received symbol after FFT. The first group of FOC methods in the prior art use the correlation of repetitive symbols. The choices of length of repetitive symbols affect the estimation accuracy and range. Thus, prior art complicated schemes are designed to address the tradeoff between estimation accuracy and range. The second group of prior art FOC methods maximizes a merit function by exhaustive search over the possible range, which is computationally expensive. The last prior art group uses a sample-shifted training symbol, however, it needs at least three training symbols and the parameter of shifted samples needs to be optimized for different value of FO. The invention frequency offset compensation is both simple and effective compared to the previous prior art methods. For one thing, there is no exhaustive search or complicated multistage algorithm, only a simple operation of finding the sample with maximum energy that is needed. In addition, only one training symbol is needed and there is no need to tune any parameter subject to different FO.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method comprising:
providing full-range pilot assisted frequency offset estimation in an orthogonal frequency-division multiplexing OFDM communication system, the providing comprises:
using a single training symbol with two identical halves as well as a pilot-tone at a center frequency for both timing synchronization and carrier frequency offset estimation;
achieving a timing synchronization by finding a peak of a cross-correlation function of the two halves in a first symbol;
calculating a fraction part of a frequency offset FO from a phase difference between the two halves of a first training symbol;
compensating a received signal for the fraction part of the frequency offset FO; and
obtaining an integer part of the FO by counting shifted positions of a pilot-tone peak in a frequency domain of received data in the OFDM communication system.

2. A computer implemented method comprising:
providing full-range pilot assisted frequency offset estimation in an orthogonal frequency-division multiplexing OFDM communication system, the providing comprising:
i) employing a single time domain training symbol of the OFDM communication system;
ii) applying a cross-correlation function to identical $1^{st}$ and $2^{nd}$ halves of the time domain training symbol;
iii) computing a timing metric as a normalized squared value of the cross-correlation function,
iv) calculating the timing metric for different timing offsets;
v) choosing a timing offset responsive to maximizing the timing metric;
vi) computing a fractional part of a frequency offset FO from a phase difference between the $1^{st}$ and $2^{nd}$ halves of the time domain training symbol at a chosen timing offset; and
(vii) obtaining an integer part of the FO by counting shifted positions of a pilot-tone peak in a frequency domain of received data in the OFDM communication system.

3. The computer implemented method of claim 2, further comprising:
viii) employing the frequency domain configuration of the training symbol;
ix) inserting the pilot tone with highest energy into the OFDM symbol at a zero frequency;

x) beating the pilot tone with a local oscillator at a receiver side of the OFDM system to shift the pilot tone away due to the frequency offset FO;

xi) compensating for the fraction part of the FO, xii) taking a fast Fourier transform of the received data in the OFDM system to find a peak position of the received data wherein the peak position is shifted N positions away, N being an integer; and xiii) estimating the integer part of the frequency offset FO as N times a subcarrier spacing in the OFDM system.

4. The computer implemented method of claim 3, wherein a number of shifted peak positions in the received data in the frequency domain directly reveals the integer part of the frequency offset FO.

5. The computer implemented method of claim 3, wherein the pilot tone is filtered out to recover carrier phase recovery for improving performance in the OFDM system.

6. The computer implemented method of claim 2, further comprising simultaneously determining frequency offset estimation with the timing metric to find a beginning of OFDM frames.

7. The computer implemented method of claim 1, wherein the cross-correlation function is based on $\Sigma_{m=0}^{L-1}(r_{d+m}^{*}r_{d+m+L})$, where L represents a training symbol length, d and m stands for a sample index in the training OFDM symbols, $r_{d+m}$ and $r_{d+m+L}$, respectively, represent the (d+m)th and (d+m+L)th OFDM samples.

8. The computer implemented method of claim 1, wherein the timing offset is found by maximizing a timing metric, the timing metric based on $$\frac{|P(d)|^2}{\left(\sum_{m=0}^{L-1}|r_{d+m+L}|^2\right)^2}$$

where L represents a training symbol length, d and m stands for a sample index in the training OFDM symbols, $r_{d+m}$ and $r_{d+m+L}$, respectively, represent the (d+m)th and (d+m+L)th OFDM samples.

9. The computer implemented method of claim 2, wherein the cross-correlation function is based on $\Sigma_{m=0}^{L-1}$ $(r_{d+m}^{*}r_{d+m+L})$, where L represents a training symbol length, d and m stands for a sample index in the training OFDM symbols, $r_{d+m}$ and $r_{d+m+L}$, respectively, represent the (d+m)th and (d+m+L)th OFDM samples.

10. The computer implemented method of claim 2, wherein the timing synchronization comprises a timing offset that is found by maximizing a timing metric, the timing metric based on $$\frac{|P(d)|^2}{\left(\sum_{m=0}^{L-1}|r_{d+m+L}|^2\right)^2}$$

where L represents a training symbol length, d and m stands for a sample index in the training OFDM symbols, $r_{d+m}$ and $r_{d+m+L}$, respectively, represent the (d+m)th and (d+m+L)th OFDM samples.

11. A non-transitory storage medium configured with instructions to be carried out by a computer to implement full-range pilot assisted frequency offset estimation in an orthogonal frequency-division multiplexing OFDM communication system, the computer including processing and memory components embedding with instructions for carrying out following steps comprising:

using a single training symbol with two identical halves as well as a pilot-tone at a center frequency for both timing synchronization and carrier frequency offset estimation;

achieving a timing synchronization by finding a peak of a cross-correlation function of the two halves in a first symbol;

calculating a fraction part of a frequency offset FO from a phase difference between the two halves of a first training symbol;

compensating a received signal for the fraction part of the frequency offset FO; and obtaining an integer part of the FO by counting shifted positions of a pilot-tone peak in a frequency domain of received data in the OFDM communication system.

* * * * *